(12) United States Patent
Kimura et al.

(10) Patent No.: US 11,268,705 B2
(45) Date of Patent: Mar. 8, 2022

(54) PNEUMATIC RADIATION UNIT

(71) Applicant: KIMURA KOHKI CO., LTD., Osaka (JP)

(72) Inventors: Keiichi Kimura, Yao (JP); Katsuhiro Urano, Sakai (JP)

(73) Assignee: KIMURA KOHKI CO., LTD., Osaka (JP)

( * ) Notice: Subject to any disclaimer, the term of this patent is extended or adjusted under 35 U.S.C. 154(b) by 103 days.

(21) Appl. No.: 16/299,608

(22) Filed: Mar. 12, 2019

(65) Prior Publication Data

US 2019/0285287 A1   Sep. 19, 2019

(30) Foreign Application Priority Data

Mar. 13, 2018 (JP) .............................. JP2018-044837
Mar. 29, 2018 (JP) .............................. JP2018-063924

(51) Int. Cl.
*F24D 3/16* (2006.01)
*F24F 1/0007* (2019.01)
(Continued)

(52) U.S. Cl.
CPC ............ *F24D 3/16* (2013.01); *F24F 1/00075* (2019.02); *F24F 5/0017* (2013.01);
(Continued)

(58) Field of Classification Search
CPC .. F24F 13/04; F24F 13/068; F24F 7/06; F24F 13/06; F24F 1/00075; F24F 5/0089; F24F 5/0092; F24F 2221/14; F24D 3/16
See application file for complete search history.

(56) References Cited

U.S. PATENT DOCUMENTS 3,033,097 A * 5/1962 Phillips ................. F24F 13/068
454/297
3,246,643 A * 4/1966 Stark ...................... A01G 9/246
126/11 OB
(Continued)

FOREIGN PATENT DOCUMENTS

CN       103968515 A       8/2014
DE       3605539 A1 *      8/1987    ............ F24F 13/068
(Continued)

OTHER PUBLICATIONS

DE3605539A1 mt (Year: 1987).*
(Continued)

*Primary Examiner* — Gordon A Jones
(74) *Attorney, Agent, or Firm* — Alleman Hall Creasman & Tuttle LLP

(57) ABSTRACT

A pneumatic radiation unit according to the present invention includes: a first chamber including a first air discharger configured to discharge air-conditioning air to a second chamber; and the second chamber including a second air discharger configured to discharge the air-conditioning air to a space to be air conditioned, the second chamber being configured to take in the air-conditioning air from the first chamber and discharge the air-conditioning air and radiate heat to the space to be air conditioned. A second aperture ratio of the second air discharger is set to be greater than a first aperture ratio of the first air discharger, or a cross-sectional area of a flow passage of the air-conditioning air in the first chamber is gradually reduced from an upwind side to a downwind side of the flow passage of the air-conditioning air.

4 Claims, 6 Drawing Sheets

(51) Int. Cl.
*F24F 5/00* (2006.01)
*F24F 13/068* (2006.01)
*F24F 13/04* (2006.01)

(52) U.S. Cl.
CPC ............ *F24F 5/0089* (2013.01); *F24F 13/04* (2013.01); *F24F 13/068* (2013.01); *F24F 5/0021* (2013.01); *F24F 5/0092* (2013.01); *F24F 2221/14* (2013.01)

(56) References Cited

U.S. PATENT DOCUMENTS

| | | | | |
|---|---|---|---|---|
| 3,308,741 | A * | 3/1967 | Chambers | F24F 13/068 454/298 |
| 3,824,909 | A * | 7/1974 | Horneff | F24F 7/10 454/187 |
| 4,227,068 | A * | 10/1980 | Carter | F24H 3/002 165/129 |
| 4,825,603 | A * | 5/1989 | Hardwicke | E04F 15/02405 52/126.6 |
| 5,318,474 | A * | 6/1994 | Klassen | F24F 13/068 454/296 |
| 6,264,551 | B1 * | 7/2001 | Smith | F24F 13/068 454/245 |
| 6,942,563 | B2 * | 9/2005 | Pesch | B60H 1/3414 454/152 |
| 7,597,617 | B2 * | 10/2009 | Solberg | F24F 13/068 454/187 |
| 2004/0198215 | A1 * | 10/2004 | Bridenne | F24F 3/163 454/187 |
| 2010/0263829 | A1 * | 10/2010 | Kimura | F24F 5/0089 165/59 |
| 2013/0186026 | A1 * | 7/2013 | Curtin | E04F 15/02417 52/302.1 |
| 2014/0287674 | A1 * | 9/2014 | Badenhorst | F24F 13/26 454/265 |
| 2018/0058707 | A1 * | 3/2018 | Kimura | F24F 3/166 |

FOREIGN PATENT DOCUMENTS

| | | |
|---|---|---|
| DE | 10160464 C1 | 8/2003 |
| GB | 2033075 A | 5/1980 |
| JP | H10148368 A | 6/1998 |
| JP | 2007155205 A | 6/2007 |
| JP | 2011021808 A | 2/2011 |
| SE | 445069 B | 5/1986 |
| WO | 8301290 A1 | 4/1983 |
| WO | 8903961 A1 | 5/1989 |
| WO | 9114905 A1 | 10/1991 |
| WO | WO-2016064320 A1 * | 4/2016 ............ B08B 15/02 |

OTHER PUBLICATIONS

European Patent Office, Extended European Search Report Issued in Application No. 19160721.7, dated Jul. 19, 2019, Germany, 8 pages.

* cited by examiner

PNEUMATIC RADIATION UNIT

CROSS-REFERENCE TO RELATED APPLICATION

This application claims priority to and the benefit of Japanese Patent Application No. 2018-044837, filed on Mar. 13, 2018, and Japanese Patent Application No. 2018-063924, filed on Mar. 29, 2018, the entire disclosure of which are incorporated herein by reference.

BACKGROUND OF THE INVENTION

Field of the Invention

The present invention relates to a pneumatic radiation unit

Description of the Related Art

Japanese Laid-Open Patent Application Publication No. 2011-21808 discloses a radiation unit including: an air feeder configured to discharge supply air fed from the outside, the air feeder discharging the supply air as a jet flow of air; an air inducer configured to draw in (i.e., induce) air from a space to be air conditioned by an inducing effect of the jet flow of air discharged from the air feeder; and an air mixer configured to discharge mixed air of the jet flow of air from the air feeder and the air induced by the air inducer to the space to be air conditioned, and radiate the heat of the mixed air to the space to be air conditioned. Owing to a radiation effect and induction reheating effect produced by this structure, comfortable air conditioning that causes neither drafty feeling nor temperature irregularity can be performed.

Although the radiation unit disclosed in Japanese Laid-Open Patent Application Publication No. 2011-21808 helps to create a comfortable space, the structure of the radiation unit is complex, causing a problem of high cost.

SUMMARY OF THE INVENTION

The present invention has been made in view of the above-described problems. An object of the present invention is to provide a pneumatic radiation unit having a simple structure and yet being capable of creating a comfortable space, making cost reduction possible.

In order to solve the above-described problems, a pneumatic radiation unit according to one aspect of the present invention includes: a first chamber, through which air-conditioning air flows; and a second chamber configured to take in the air-conditioning air from the first chamber and discharge the air-conditioning air and radiate heat to a space to be air conditioned. The first chamber includes a first air discharger that is in contact with the second chamber and configured to discharge the air-conditioning air to the second chamber. The second chamber includes a second air discharger that is in contact with the space to be air conditioned and configured to discharge the air-conditioning air to the space to be air conditioned. A second aperture ratio of the second air discharger is set to be greater than a first aperture ratio of the first air discharger, or a cross-sectional area of a flow passage of the air-conditioning air in the first chamber is gradually reduced from an upwind side to a downwind side of the flow passage of the air-conditioning air.

Owing to the above-described configuration, the pneumatic radiation unit according to the one aspect of the present invention has an advantage of having a simple structure and yet being capable of creating a comfortable space, making cost reduction possible.

The above and further objects, features, and advantages of the present invention will more fully be apparent from the following detailed description of preferred embodiments with accompanying drawings.

DESCRIPTION OF THE PREFERRED EMBODIMENTS

Figure 1:
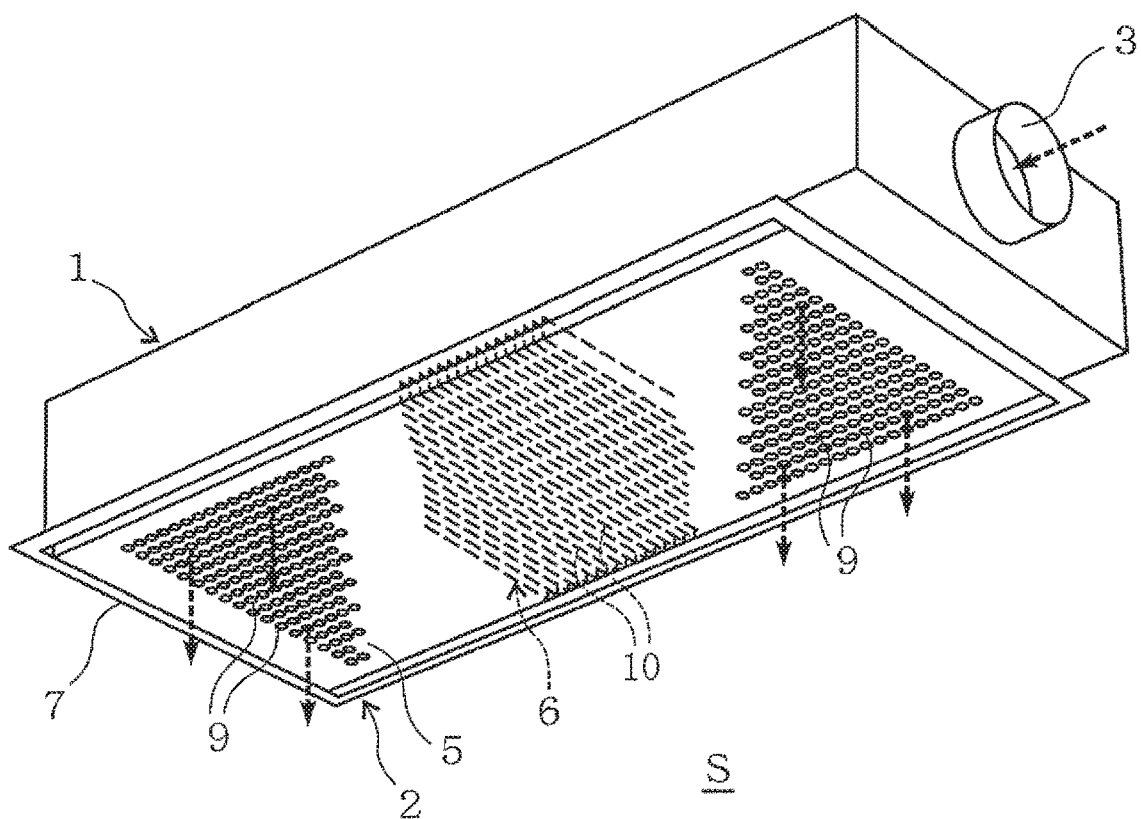
FIG. 1 is a bottom-side perspective view of a pneumatic radiation unit according to Embodiment 1 of the present invention.
Figure 2:
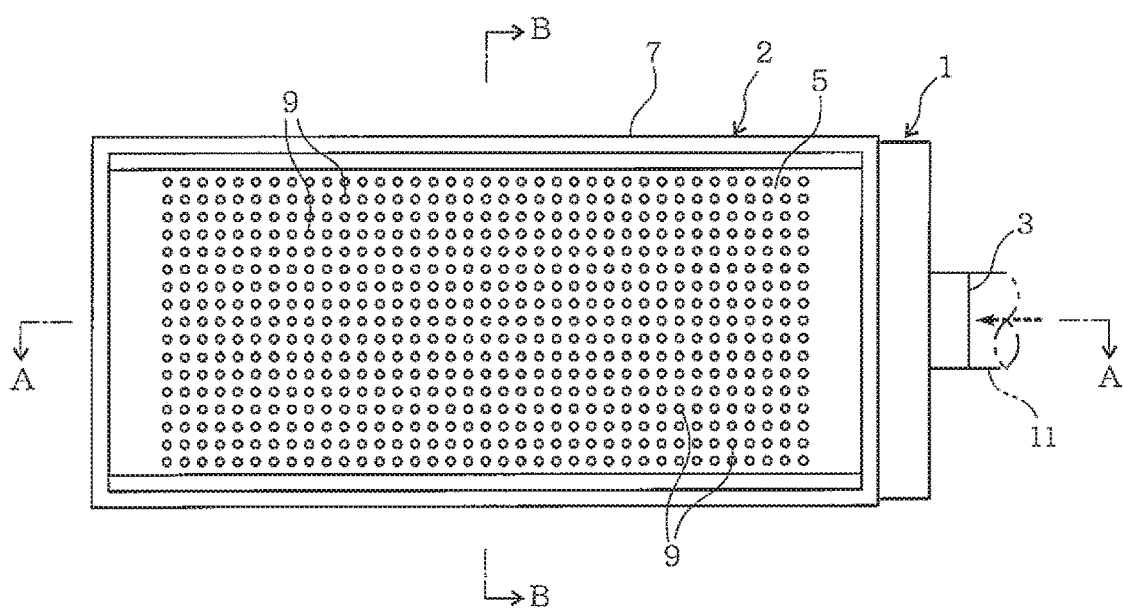
FIG. 2 is a bottom view of the pneumatic radiation unit of FIG. 1.

Specifically, the present invention provides various aspects described below.

A pneumatic radiation unit according to a first aspect of the present invention includes: a first chamber, through which air-conditioning air flows; and a second chamber configured to take in the air-conditioning air from the first chamber and discharge the air-conditioning air and radiate heat to a space to be air conditioned. The first chamber includes a first air discharger that is in contact with the second chamber and configured to discharge the air-conditioning air to the second chamber. The second chamber includes a second air discharger that is in contact with the space to be air conditioned and configured to discharge the air-conditioning air to the space to be air conditioned. A second aperture ratio of the second air discharger is set to be greater than a first aperture ratio of the first air discharger, or a cross-sectional area of a flow passage of the air-conditioning air in the first chamber is gradually reduced from an upwind side to a downwind side of the flow passage of the air-conditioning air.

The above configuration adopts a simple structure in which the second aperture ratio of the second air discharger is made greater than the first aperture ratio of the first air discharger. Owing to this simple structure, the flow velocity of the air-conditioning air is gradually reduced by decreasing the dynamic pressure of the air-conditioning air and increasing the static pressure of the air-conditioning air in two stages, and thereby the air-conditioning air can be spread over the entire space in the first chamber and the second chamber. Consequently, the air-conditioning air can be uniformly discharged and the heat can be uniformly radiated to the space to be air conditioned, which makes it possible to perform comfortable air conditioning that causes neither drafty feeling nor temperature irregularity.

Alternatively, the above configuration adopts another simple structure in which the cross-sectional area of the flow passage of the air-conditioning air in the first chamber is gradually reduced from the upwind side to the downwind side of the flow passage of the air-conditioning air. Owing to such a simple structure, the flow velocity of the air-conditioning air is increased from the upwind side to the downwind side of the flow passage of the air-conditioning air, and thereby the air-conditioning air can be spread over the entire space in the first chamber and the second chamber. Consequently, the air-conditioning air can be uniformly discharged and the heat can be uniformly radiated to the space to be air conditioned, which makes it possible to perform comfortable air conditioning that causes neither drafty feeling nor temperature irregularity.

As described above, the pneumatic radiation unit according to the first aspect of the present invention has an advantage of having a simple structure and yet being capable of creating a comfortable space, making cost reduction possible.

A pneumatic radiation unit according to a second aspect of the present invention may be configured such that, in the above first aspect, the second aperture ratio of the second air discharger is set to be greater than the first aperture ratio of the first air discharger.

The above configuration adopts a simple structure in which the second aperture ratio of the second air discharger is made greater than the first aperture ratio of the first air discharger. Owing to this simple structure, the flow velocity of the air-conditioning air is gradually reduced by decreasing the dynamic pressure of the air-conditioning air and increasing the static pressure of the air-conditioning air in two stages, and thereby the air-conditioning air can be spread over the entire space in the first chamber and the second chamber. Consequently, the air-conditioning air can be uniformly discharged and the heat can be uniformly radiated to the space to be air conditioned, which makes it possible to perform comfortable air conditioning that causes neither drafty feeling nor temperature irregularity.

A pneumatic radiation unit according to a third aspect of the present invention may be configured such that, in the above second aspect, the first air discharger includes a large number of first through holes, through which the air-conditioning air is discharged from the first chamber to the second chamber, such that the first air discharger has the first aperture ratio, and the second air discharger includes a large number of second through holes, through which the air-conditioning air is discharged from the second chamber to the space to be air conditioned, such that the second air discharger has the second aperture ratio.

According to the above configuration, the simple structure, in which the two chambers (i.e., the first chamber and the second chamber) include the through holes (i.e., the first through holes and the second through holes) such that each chamber has its predetermined aperture ratio, makes it possible to lower the cost, reduce the weight, and yet have high stiffness, and also, ease the installation and maintenance of the pneumatic radiation unit.

A pneumatic radiation unit according to a fourth aspect of the present invention may be configured such that, in the above second or third aspect, the second chamber includes a heat storage unit, and in the heat storage unit, plates that store and radiate heat of the air-conditioning air are arranged to be spaced apart from each other such that gaps are formed between the plates, the gaps extending in a direction in which the air-conditioning air that has passed through the first through holes of the first air discharger flows.

According to the above configuration, the heat storage unit can be used for both storing the heat of the air-conditioning air and straightening the flow of the air-conditioning air. This makes it possible to improve thermal radiation performance and assuredly reduce air volume irregularity and temperature irregularity.

A pneumatic radiation unit according to a fifth aspect of the present invention may be configured such that, in any one of the above second to fourth aspects, each of the first chamber and the second chamber is formed to have a flattened shape, and the first chamber and the second chamber are adjacent to each other in a direction in which the first chamber and the second chamber are flattened.

According to the above configuration, each of the first chamber and the second chamber is formed to have a flattened shape. Accordingly, the entire pneumatic radiation unit has a flattened shape. Therefore, even if the space above the ceiling is small, the pneumatic radiation unit can be readily installed in the space, and this configuration further eases the installation and maintenance of the pneumatic radiation unit.

A pneumatic radiation unit according to a sixth aspect of the present invention may be configured such that, in any one of the above second to fifth aspects, the second air discharger of the second chamber is formed to have a corrugated shape.

According to the above configuration, since the second air discharger has a corrugated shape, the thermal radiation area is increased, which makes it possible to further improve the thermal radiation performance.

A pneumatic radiation unit according to a seventh aspect of the present invention may be configured such that, in the above first aspect, the cross-sectional area of the flow passage of the air-conditioning air in the first chamber is gradually reduced from the upwind side to the downwind side of the flow passage of the air-conditioning air.

The above configuration adopts a simple structure in which the cross-sectional area of the flow passage of the air-conditioning air in the first chamber is gradually reduced from the upwind side to the downwind side of the flow passage of the air-conditioning air. Owing to such a simple structure, the flow velocity of the air-conditioning air is increased from the upwind side to the downwind side of the flow passage of the air-conditioning air, and thereby the air-conditioning air can be spread over the entire space in the first chamber and the second chamber. Consequently, the air-conditioning air can be uniformly discharged and the heat can be uniformly radiated to the space to be air conditioned, which makes it possible to perform comfortable air conditioning that causes neither drafty feeling nor temperature irregularity.

A pneumatic radiation unit according to an eighth aspect of the present invention may be configured such that, in the above seventh aspect, the first air discharger includes a first through hole, through which the air-conditioning air is discharged from the first chamber to the second chamber, and the second air discharger includes a large number of second through holes, through which the air-conditioning air is discharged from the second chamber to the space to be air conditioned.

The above configuration realizes a simple structure in which the cross-sectional area of the flow passage of the air-conditioning air in the first chamber is gradually reduced from the upwind side to the downwind side of the flow passage of the air-conditioning air, and the second through holes are formed in the second chamber. This makes it possible to lower the cost, reduce the weight, and yet have high stiffness, and also, ease the installation and maintenance of the pneumatic radiation unit.

A pneumatic radiation unit according to a ninth aspect of the present invention may be configured such that, in the above eighth aspect, the second chamber includes a heat storage unit, and in the heat storage unit, plates that store and radiate heat of the air-conditioning air are arranged to be spaced apart from each other such that gaps are formed between the plates, the gaps extending in a direction in which the air-conditioning air that has passed through the first through hole of the first air discharger flows.

According to the above configuration, the heat storage unit can be used for both storing the heat of the air-conditioning air and straightening the flow of the air-conditioning air. This makes it possible to improve thermal radiation performance and assuredly reduce air volume irregularity and temperature irregularity.

A pneumatic radiation unit according to a tenth aspect of the present invention may be configured such that, in any one of the above seventh to ninth aspects, each of the first chamber and the second chamber is formed to have a flattened shape, and the first chamber and the second chamber are adjacent to each other in a direction in which the first chamber and the second chamber are flattened.

According to the above configuration, each of the first chamber and the second chamber is formed to have a flattened shape. Accordingly, the entire pneumatic radiation unit has a flattened shape. Therefore, even if the space above the ceiling is small, the pneumatic radiation unit can be readily installed in the space, and this configuration further eases the installation and maintenance of the pneumatic radiation unit.

A pneumatic radiation unit according to an eleventh aspect of the present invention may be configured such that, in any one of the above seventh to tenth aspects, the second air discharger of the second chamber is formed to have a corrugated shape.

According to the above configuration, since the second air discharger has a corrugated shape, the thermal radiation area is increased, which makes it possible to further improve the thermal radiation performance.

Embodiment 1

FIGS. 1 to 5 show a pneumatic radiation unit according to Embodiment 1 of the present invention. The pneumatic radiation unit includes: a first chamber 1, through which air-conditioning air flows; and a second chamber 2 configured to take in the air-conditioning air from the first chamber 1 and discharge the air-conditioning air and radiate heat to a space S to be air conditioned, such as a room. In the drawings, bold dotted arrows each indicate a direction in which the air-conditioning air flows.

The first chamber 1 includes: an air inlet 3, through which the air-conditioning air is taken in; and a flat plate-shaped first air discharger 4, which is in contact with the second chamber 2 and configured to discharge the air-conditioning air to the internal space of the second chamber 2. The second chamber 2 includes: a flat plate-shaped second air discharger 5, which is in contact with the space S to be air conditioned and configured to discharge the air-conditioning air to the space S to be air conditioned; a heat storage unit 6; and a flange-equipped frame member 7, to which the second air discharger 5 and the heat storage unit 6 are mounted.

The pneumatic radiation unit is installed, for example, on the ceiling of the space S to be air conditioned, such that the second air discharger 5 faces the space S to be air conditioned. The air inlet 3 is connected to an air outlet of an unshown air conditioner via a duct 11, and the air-conditioning air is supplied from the air conditioner to the internal space of the first chamber 1.

Figure 3:
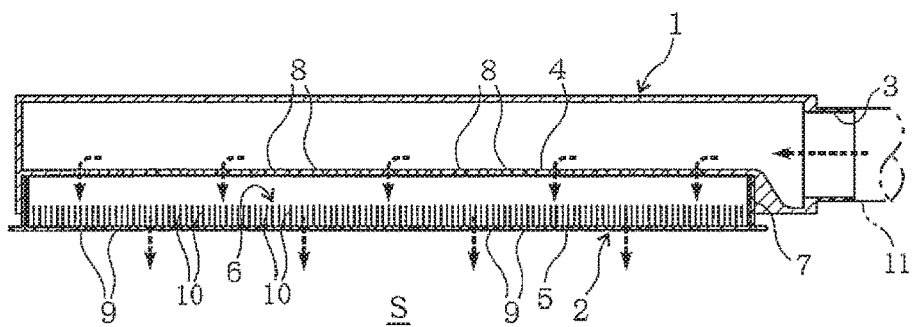
FIG. 3 is a sectional view of the pneumatic radiation unit of FIG. 2 taken along line A-A of FIG. 2.
Figure 4:
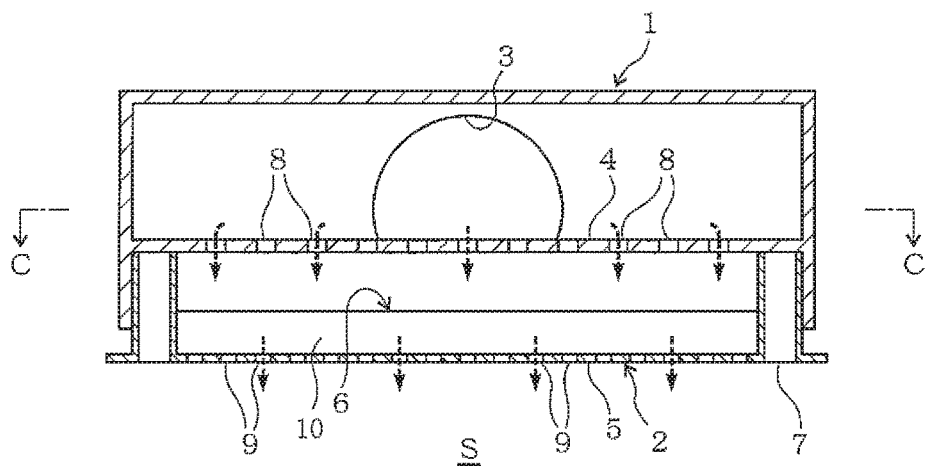
FIG. 4 is a sectional view of the pneumatic radiation unit of FIG. 2 taken along line B-B of FIG. 2.
Figure 5:
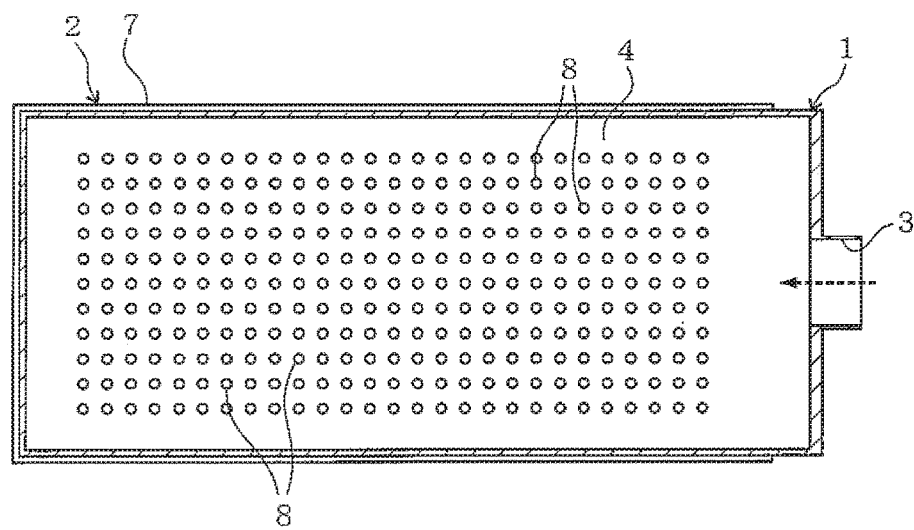
FIG. 5 is a sectional view of the pneumatic radiation unit of FIG. 4 taken along line C-C of FIG. 4.

Each of the first chamber 1 and the second chamber 2 is formed to have a flattened shape, and the first chamber 1 and the second chamber 2 are adjacent to each other in a direction in which the first chamber 1 and the second chamber 2 are flattened (i.e., in the vertical direction in FIGS. 3 and 4). In other words, the first chamber 1 and the second chamber 2 are provided adjacently to each other, such that a main flat surface of the first chamber 1 having the flattened shape and a main flat surface of the second chamber 2 having the flattened shape are arranged at positions opposite to each other. In the illustrated example, each of the first chamber 1 and the second chamber 2 has a rectangular flattened shape. However, the shape of each of these chambers may be freely changed into any of various flattened shapes, such as a long and thin flattened shape, a square flattened shape, and a round flattened shape.

The first air discharger 4 includes a large number of first through holes 8, through which the air-conditioning air is discharged from the first chamber 1 to the second chamber 2, such that the first air discharger 4 has a predetermined first aperture ratio. The second air discharger 5 includes a large number of second through holes 9, through which the air-conditioning air is discharged from the second chamber 2 to the space S to be air conditioned, such that the second air discharger 5 has a predetermined second aperture ratio. The second aperture ratio of the second air discharger 5 is set to be greater than the first aperture ratio of the first air discharger 4.

These aperture ratios are set such that, for example, the second aperture ratio of the second air discharger 5 is 70 to 80% and the first aperture ratio of the first air discharger 4 is 40 to 60%. Owing to such setting, the flow velocity of the air-conditioning air is gradually reduced by decreasing the dynamic pressure of the air-conditioning air and increasing the static pressure of the air-conditioning air in two stages. The shape of the first through holes 8 and the second through holes 9 may be freely selected from among various shapes, such as perfect circle, ellipse, elongated hole, thin slit, etc. Also, the number and dimensions of the through holes 8 and 9 may be freely selected.

In the heat storage unit 6, plates 10, which store and radiate the heat of the air-conditioning air, are arranged to be spaced apart from each other such that gaps are formed between the plates 10, the gaps extending in a direction in which the air-conditioning air that has passed through the first through holes 8 of the first air discharger 4 flows. The plates 10 and the second air discharger 5 are made of, for example, aluminum whose thermal conductivity and thermal radiation rate are high.

While passing through the plates 10, the air-conditioning air spreads out by being divided by the plates 10 into multiple flows that are also straightened by the plates 10, and then the flows of the air-conditioning air are discharged to the space S to be air conditioned through the second through holes 9 of the second air discharger 5. The heat of the air-conditioning air is thermally transferred to the plates 10 and the second air discharger 5, and then radiated from the second through holes 9 and the second air discharger 5 to the space S to be air conditioned.

Variations

Figure 6:
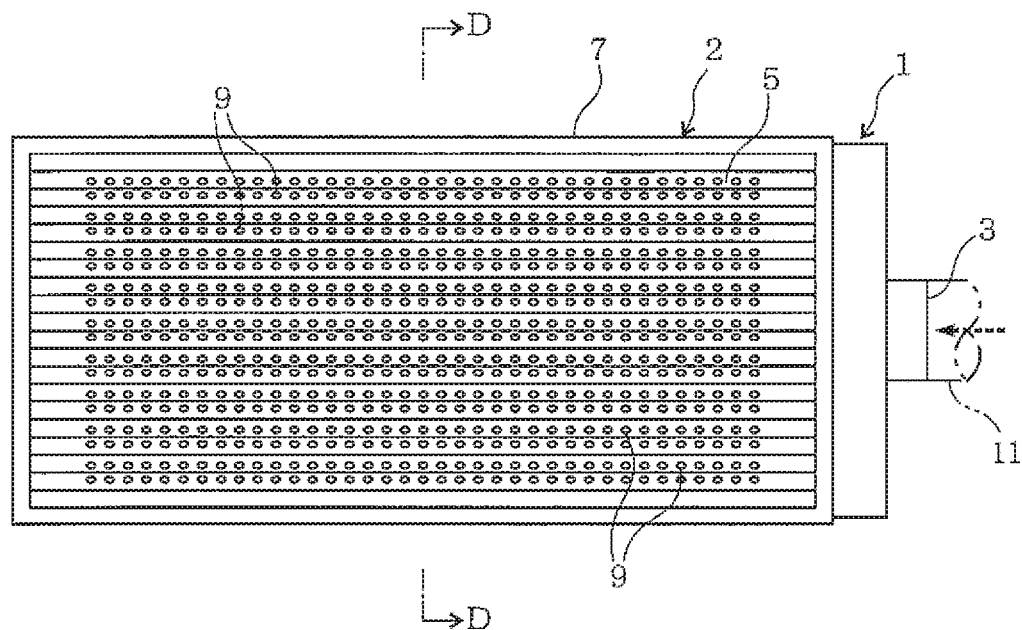
FIG. 6 is a bottom view of another pneumatic radiation unit.
Figure 7:
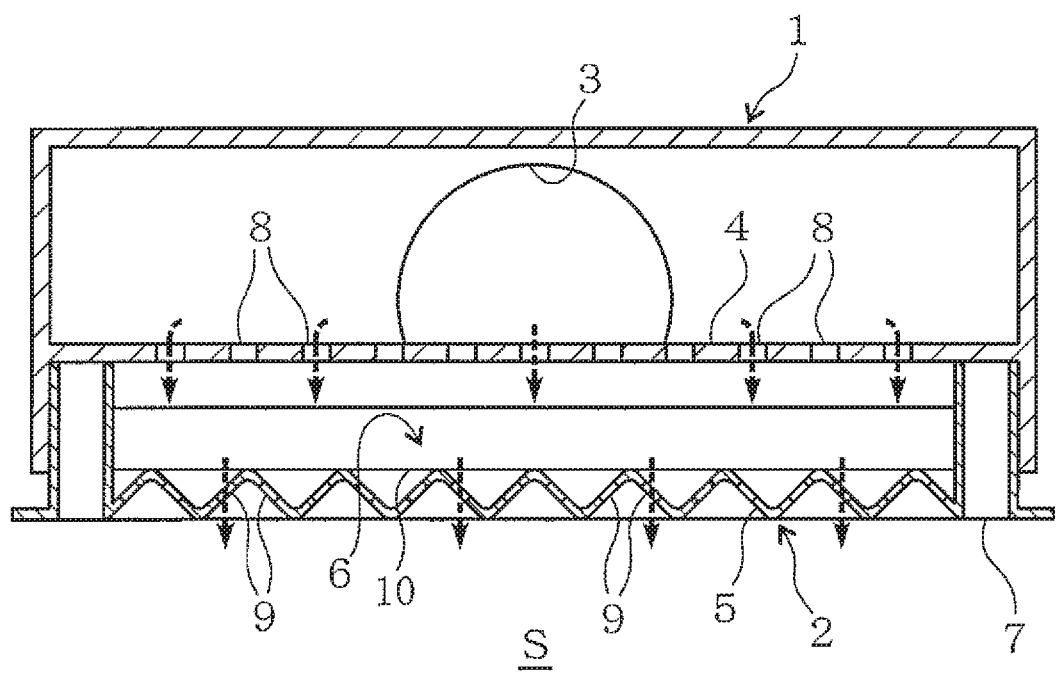
FIG. 7 is a sectional view of the pneumatic radiation unit of FIG. 6 taken along line D-D of FIG. 6.
Figure 8:
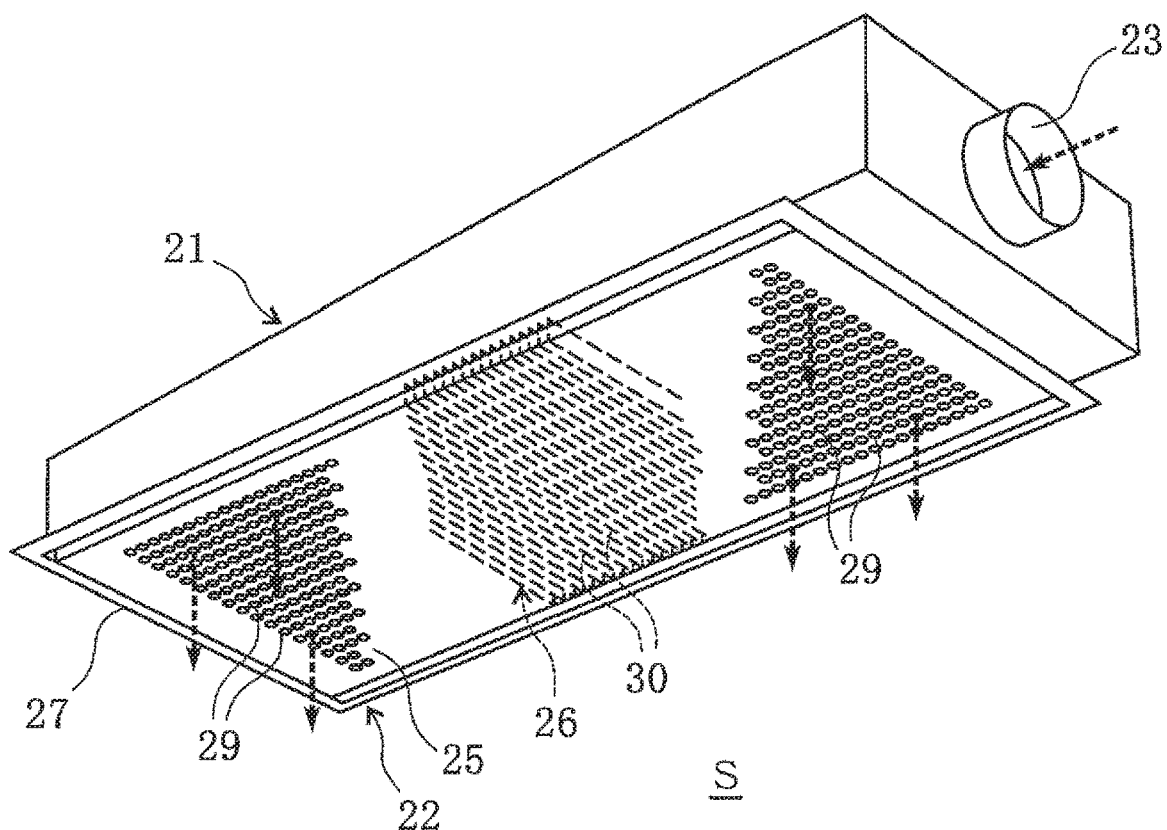
FIG. 8 is a bottom-side perspective view of a pneumatic radiation unit according to Embodiment 2 of the present invention.
Figure 9:
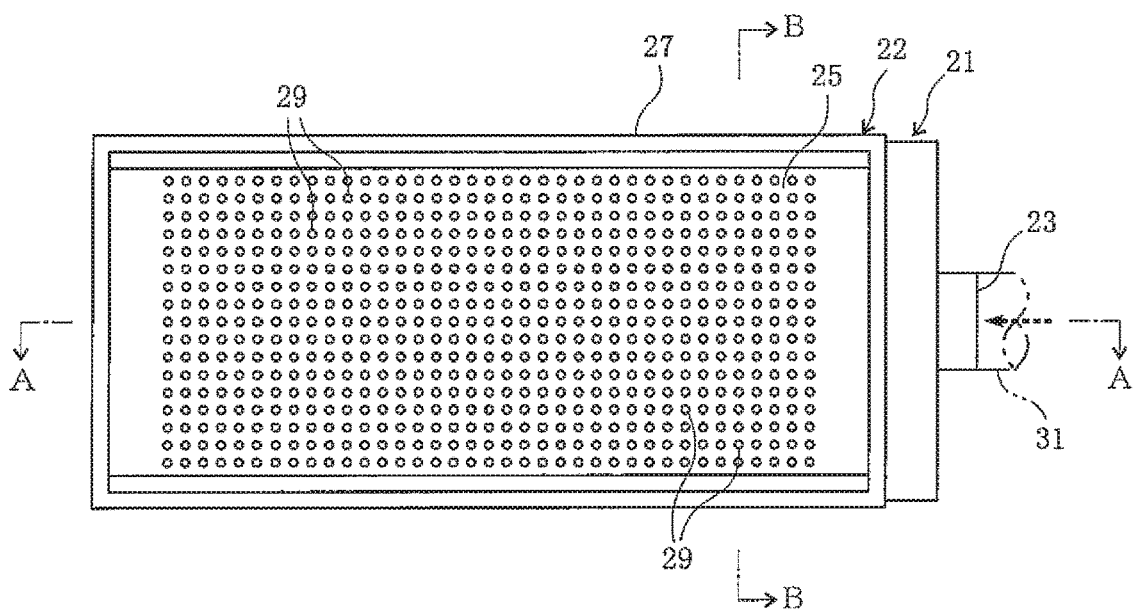
FIG. 9 is a bottom view of the pneumatic radiation unit of FIG. 8.

FIGS. 6 and 7 show a pneumatic radiation unit according to one variation of Embodiment 1 of the present invention. The pneumatic radiation unit according to this variation is configured such that, in the second chamber 2 of the pneumatic radiation unit according to Embodiment 1, the second air discharger 5 including a large number of second through holes 9 is formed to have a corrugated shape. It should be noted that the inclination angle, the height, and the number of ridges and grooves of the corrugated shape may be freely selected. Since the other configuration features of the pneumatic radiation unit according to this variation are the same as those of the pneumatic radiation unit according to Embodiment 1 shown in FIG. 1, the description thereof is omitted.

Embodiment 2

FIGS. 8 to 12 show a pneumatic radiation unit according to Embodiment 2 of the present invention. The pneumatic radiation unit includes: a first chamber 21, through which air-conditioning air flows; and a second chamber 22 configured to take in the air-conditioning air from the first chamber 21 and discharge the air-conditioning air and radiate heat to a space S to be air conditioned, such as a room. In the drawings, bold dotted arrows each indicate a direction in which the air-conditioning air flows.

The first chamber 21 includes: an air inlet 23, through which the air-conditioning air is taken in; and a flat plate-shaped first air discharger 24, which is in contact with the second chamber 22 and configured to discharge the air-conditioning air to the internal space of the second chamber 22. The second chamber 22 includes: a flat plate-shaped second air discharger 25, which is in contact with the space S to be air conditioned and configured to discharge the air-conditioning air to the space S to be air conditioned; a heat storage unit 26; and a flange-equipped frame member 27, to which the second air discharger 25 and the heat storage unit 26 are mounted.

The pneumatic radiation unit is installed, for example, on the ceiling of the space S to be air conditioned, such that the second air discharger 25 faces the space S to be air conditioned. The air inlet 23 is connected to an air outlet of an unshown air conditioner via a duct 31, and the air-conditioning air is supplied from the air conditioner to the internal space of the first chamber 21.

Figure 10:
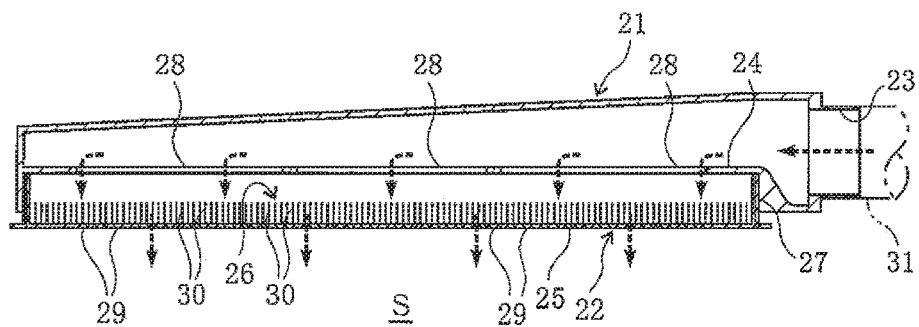
FIG. 10 is a sectional view of the pneumatic radiation unit of FIG. 9 taken along line A-A of FIG. 9.
Figure 11:
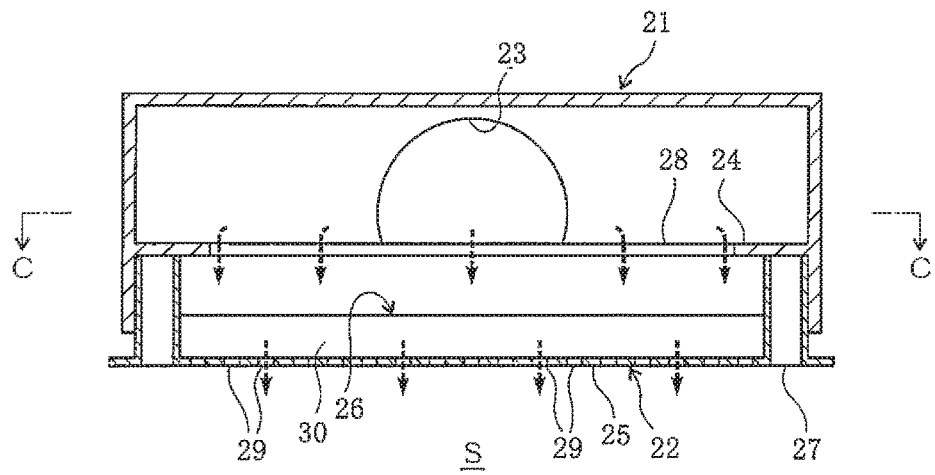
FIG. 11 is a sectional view of the pneumatic radiation unit of FIG. 9 taken along line B-B of FIG. 9.
Figure 12:
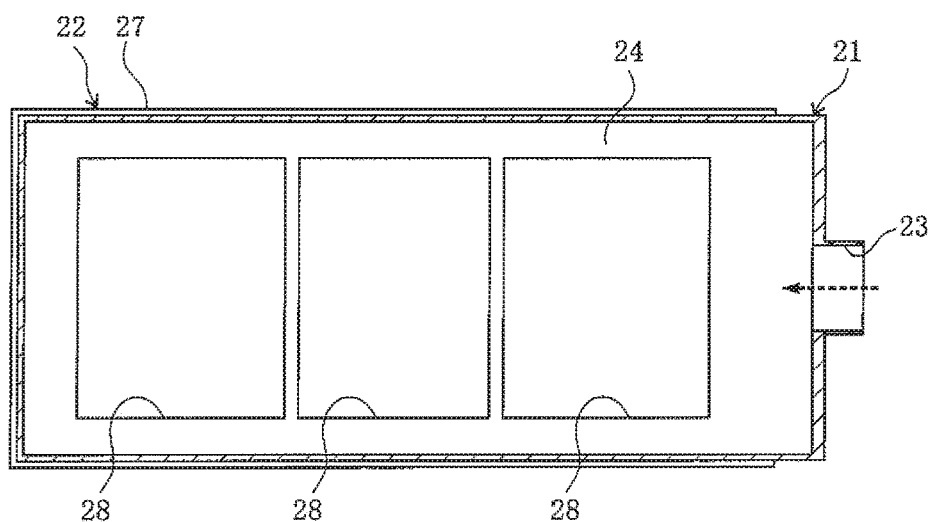
FIG. 12 is a sectional view of the pneumatic radiation unit of FIG. 11 taken along line C-C of FIG. 11.

Each of the first chamber 21 and the second chamber 22 is formed to have a flattened shape, and the first chamber 21 and the second chamber 22 are adjacent to each other in a direction in which the first chamber 21 and the second chamber 22 are flattened (i.e., in the vertical direction in FIGS. 10 and 11). In other words, the first chamber 21 and the second chamber 22 are provided adjacently to each other, such that a main flat surface of the first chamber 21 having the flattened shape and a main flat surface of the second chamber 22 having the flattened shape are arranged at positions opposite to each other. In the illustrated example, each of the first chamber 21 and the second chamber 22 has a rectangular flattened shape. However, the shape of each of these chambers may be freely changed into any of various flattened shapes, such as a long and thin flattened shape, a square flattened shape, and a round flattened shape.

The cross-sectional area of a flow passage of the air-conditioning air in the first chamber 21 (i.e., the cross-sectional area parallel to line B-B of FIG. 9) is set such that the cross-sectional area is gradually reduced from the upwind side to the downwind side of the flow passage of the air-conditioning air. In the illustrated example, both outer and inner surfaces of the first chamber 21 are sloped to reduce the cross-sectional area. However, as an alternative, only the inner surface may be sloped to reduce the cross-sectional area without sloping the outer surface.

The first air discharger 24 includes first through holes 28, through which the air-conditioning air is discharged from the first chamber 21 to the second chamber 22. In the illustrated example, dividing portions between the first through holes 28 double as ribs, thereby increasing the stiffness of the first air discharger 24. The second air discharger 25 includes a large number of second through holes 29, through which the air-conditioning air is discharged from the second chamber 22 to the space S to be air conditioned, such that the second air discharger 25 has a predetermined second aperture ratio. The second aperture ratio of the second air discharger 25 is set to 70 to 80%, for example. The shape of the first through holes 28 and the second through holes 29 may be freely selected from among various shapes, such as perfect circle, ellipse, elongated hole, thin slit, etc. Also, the number and dimensions of the through holes 28 and 29 may be freely selected.

In the heat storage unit 26, plates 30, which store and radiate the heat of the air-conditioning air, are arranged to be spaced apart from each other such that gaps are formed between the plates 30, the gaps extending in a direction in which the air-conditioning air that has passed through the first through holes 28 of the first air discharger 24 flows. The plates 30 and the second air discharger 25 are made of, for example, aluminum whose thermal conductivity and thermal radiation rate are high.

While passing through the plates 30, the air-conditioning air spreads out by being divided by the plates 30 into multiple flows that are also straightened by the plates 30, and then the flows of the air-conditioning air are discharged to the space S to be air conditioned through the second through holes 29 of the second air discharger 25. The heat of the air-conditioning air is thermally transferred to the plates 30 and the second air discharger 25, and then radiated from the second through holes 29 and the second air discharger 25 to the space S to be air conditioned.

Variations

Figure 13:
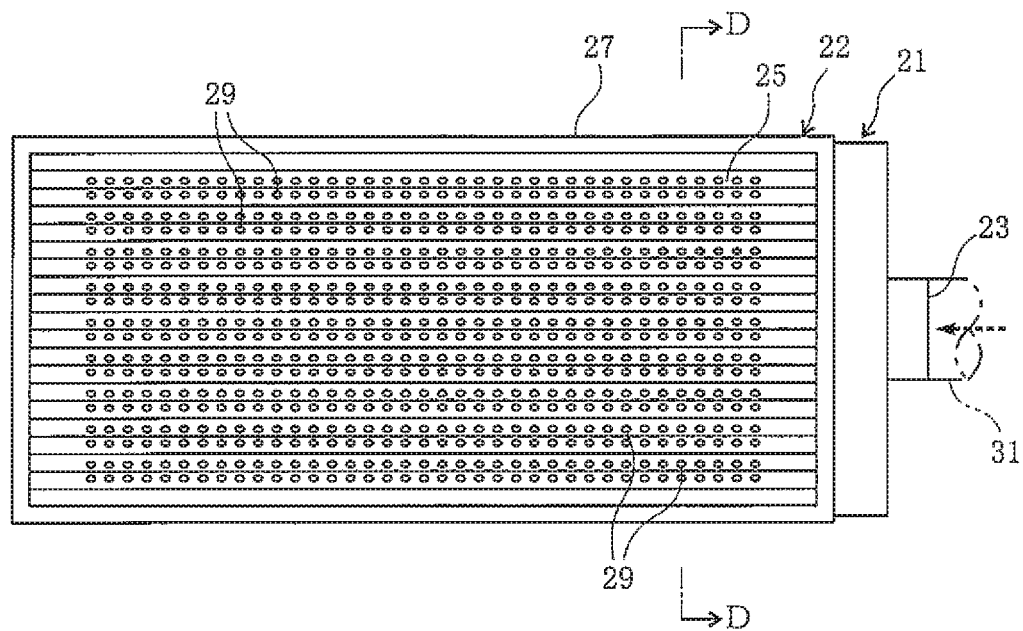
FIG. 13 is a bottom view of another pneumatic radiation unit.
Figure 14:
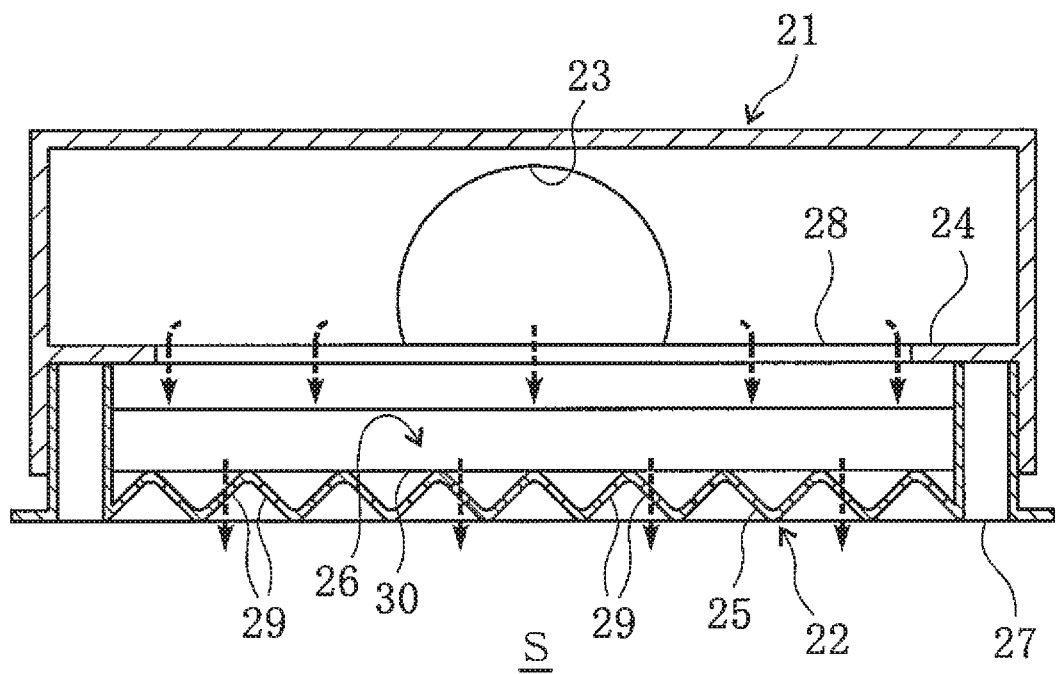
FIG. 14 is a sectional view of the pneumatic radiation unit of FIG. 13 taken along line D-D of FIG. 13.

FIGS. 13 and 14 show a pneumatic radiation unit according to one variation of Embodiment 2 of the present invention. The pneumatic radiation unit according to this variation is configured such that, in the second chamber 22 of the pneumatic radiation unit according to Embodiment 2, the second air discharger 25 including a large number of second through holes 29 is formed to have a corrugated shape. It should be noted that the inclination angle, the height, and the number of ridges and grooves of the corrugated shape may be freely selected. Since the other configuration features of the pneumatic radiation unit according to this variation are the same as those of the pneumatic radiation unit according to Embodiment 2 shown in FIG. 8, the description thereof is omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A pneumatic radiation unit comprising:
   a first chamber, through which air-conditioning air flows; and
   a second chamber configured to take in the air-conditioning air from the first chamber and discharge the air-conditioning air and radiate heat to a space to be air conditioned, wherein
   the first chamber includes a first air discharger that is in contact with the second chamber and configured to discharge the air-conditioning air to the second chamber,
   the second chamber includes a second air discharger that is in contact with the space to be air conditioned and configured to discharge the air-conditioning air to the space to be air conditioned,
   the first chamber and the second chamber are adjacent to each other, with the first air discharger positioned between the first chamber and the second chamber,
   the first air discharger includes a plurality of first through holes, through which the air-conditioning air is discharged from the first chamber to the second chamber,
   the second air discharger includes a plurality of second through holes, through which the air-conditioning air is discharged from the second chamber to the space to be air conditioned,
   the second chamber includes a plurality of plates that store and radiate heat of the air-conditioning air,
   the plurality of plates are arranged to be spaced apart from each other such that gaps are formed between the plates, the gaps extending in a direction in which the air-conditioning air that has passed through the plurality of first through holes flows,
   the plurality of first through holes, the plurality of second through holes, and the plurality of plates are arranged such that the plurality of second through holes and the plurality of plates face the plurality of first through holes,
   a second aperture ratio of the second air discharger is set to be greater than a first aperture ratio of the first air discharger,
   the first aperture ratio is a ratio of an opening area of the plurality of first through holes to an area of the first air discharger,
   the second aperture ratio is a ratio of an opening area of the plurality of second through holes to an area of the second air discharger, and
   the first aperture ratio is within a range from 40 to 60%, and the second aperture ratio is within a range from 70 to 80%.

2. The pneumatic radiation unit according to claim 1, wherein
   each of the first chamber and the second chamber is formed to have a flattened shape, and
   the first chamber and the second chamber are adjacent to each other in a direction in which the first chamber and the second chamber are flattened.

3. The pneumatic radiation unit according to claim 1, wherein
   the second air discharger of the second chamber is formed to have a corrugated shape.

4. The pneumatic radiation unit according to claim 1, wherein
   the area of the second air discharger is less than or equal to the area of the first air discharger.

* * * * *